United States Patent [19]

Catlett

[11] 4,220,051

[45] Sep. 2, 1980

[54] ELECTROMECHANICAL DOOR OPERATOR

[75] Inventor: John C. Catlett, Avon, Conn.

[73] Assignee: The Stanley Works, New Britain, Conn.

[21] Appl. No.: 905,767

[22] Filed: May 15, 1978

[51] Int. Cl.$^2$ .......................... E05F 11/00; F16H 27/02

[52] U.S. Cl. .................................... 74/89.15; 74/89.17; 49/137; 49/264; 49/274; 49/334; 49/336

[58] Field of Search .................. 49/137, 273, 274, 266, 49/264, 334-336, 340, 388; 74/30, 33, 89, 89.11, 89.12, 89.15, 89.17-89.19, 522; 267/150, 168

[56] References Cited

U.S. PATENT DOCUMENTS

| | | | |
|---|---|---|---|
| 212,688 | 2/1879 | Hansell | 267/168 X |
| 1,540,707 | 6/1925 | Ormsbee | 74/30 |
| 1,594,469 | 8/1926 | Schornack | 74/30 |
| 2,316,528 | 4/1943 | Miles | 49/388 |
| 2,782,832 | 2/1957 | Shaw | 74/89.17 X |
| 3,039,764 | 6/1962 | Heinsman et al. | 49/264 X |
| 3,087,720 | 4/1963 | Catlett | 49/336 X |
| 3,602,342 | 8/1971 | Whittle | 74/522 X |

FOREIGN PATENT DOCUMENTS

| | | | |
|---|---|---|---|
| 284967 | 9/1965 | Australia | 49/334 |
| 1037317 | 8/1958 | Fed. Rep. of Germany | 49/334 |
| 1233664 | 2/1967 | Fed. Rep. of Germany | 267/150 |

*Primary Examiner*—Lawrence J. Staab
*Attorney, Agent, or Firm*—Prutzman, Kalb, Chilton & Alix

[57] ABSTRACT

A door operator with a reciprocable rack gear adapted to be actuated in opposite directions by an electric motor driven screw and a coaxial helical compression spring for rotating a drive gear of a door operating spindle in opposite directions for opening and closing a swinging door, the rack gear forming part of a spindle operator having lateral bearings engageable with the ends of the spindle and adapted to be mounted in either of two 180° angularly spaced positions about the axis of the drive screw for rotating the spindle in opposite directions, and the coaxial compression spring being operable via the rack gear for biasing the spindle in both directions to an intermediate position thereof.

25 Claims, 8 Drawing Figures

ELECTROMECHANICAL DOOR OPERATOR

BRIEF SUMMARY OF THE INVENTION

The present invention relates generally to improvements in door operators of the type having a rotary drive shaft adapted to be connected to a swinging door, either directly or indirectly by a suitable linkage, for opening and closing the door.

It is a primary aim of the present invention to provide a new and improved electric motor operated door operator for a swinging door which is compact and reliable and which permits manually opening the swinging door, for example in an emergency.

It is another aim of the present invention to provide a new and improved door operator for a swinging door which may be used for opening the door in either direction.

It is a further aim of the present invention to provide a new and improved electric motor operated door operator for a swinging door which can be internally or in-header mounted concealed in the header of a doorway or externally or surface mounted on the doorway header at either the entrance or exit side of the doorway. In accordance with the present invention, the door operator may be either internally or externally mounted and yet provide for opening a swinging door in either direction a predetermined angle of for example 90° or more.

It is another aim of the present invention to provide a new and improved automatic door operator which permits door overtravel beyond its normal fully open position without damaging the door operator.

It is a still further aim of the present invention to provide a new and improved door operator of the type having a rotary electric motor for opening a door, holding it open and controlling its rate of closure.

It is another aim of the present invention to provide a new and improved door operator for a swinging door for opening the door in either direction and providing for spring closure of the swinging door from either side of the doorway.

It is a further aim of the present invention to provide a new and improved door operator for a swinging door which provides for manually opening the swinging door in the opposite direction to the normal opening direction and automatic spring closure of the door to its normal closed position.

It is another aim of the present invention to provide a new and improved electric motor operated door operator which may be automatically controlled by a doorway mat switch or other traffic responsive switch.

It is a still further aim of the present invention to provide in an in-header mounted door operator for a swinging door, a new and improved door adjustment mechanism for accurately adjusting the closed angular position of the swinging door.

It is another aim of the present invention to provide a new and improved door operator which may be selectively used in in-header and surface mounted installations for opening a swinging door fully in either direction and which provides for spring closure of the door from either side of the doorway.

Other objects will be part obvious and in part pointed out more in detail hereinafter.

A better understanding of the invention will be obtained from the following detailed description and the accompanying drawings of illustrative applications of the invention.

DESCRIPTION OF THE PREFERRED EMBODIMENT

Figure 1:
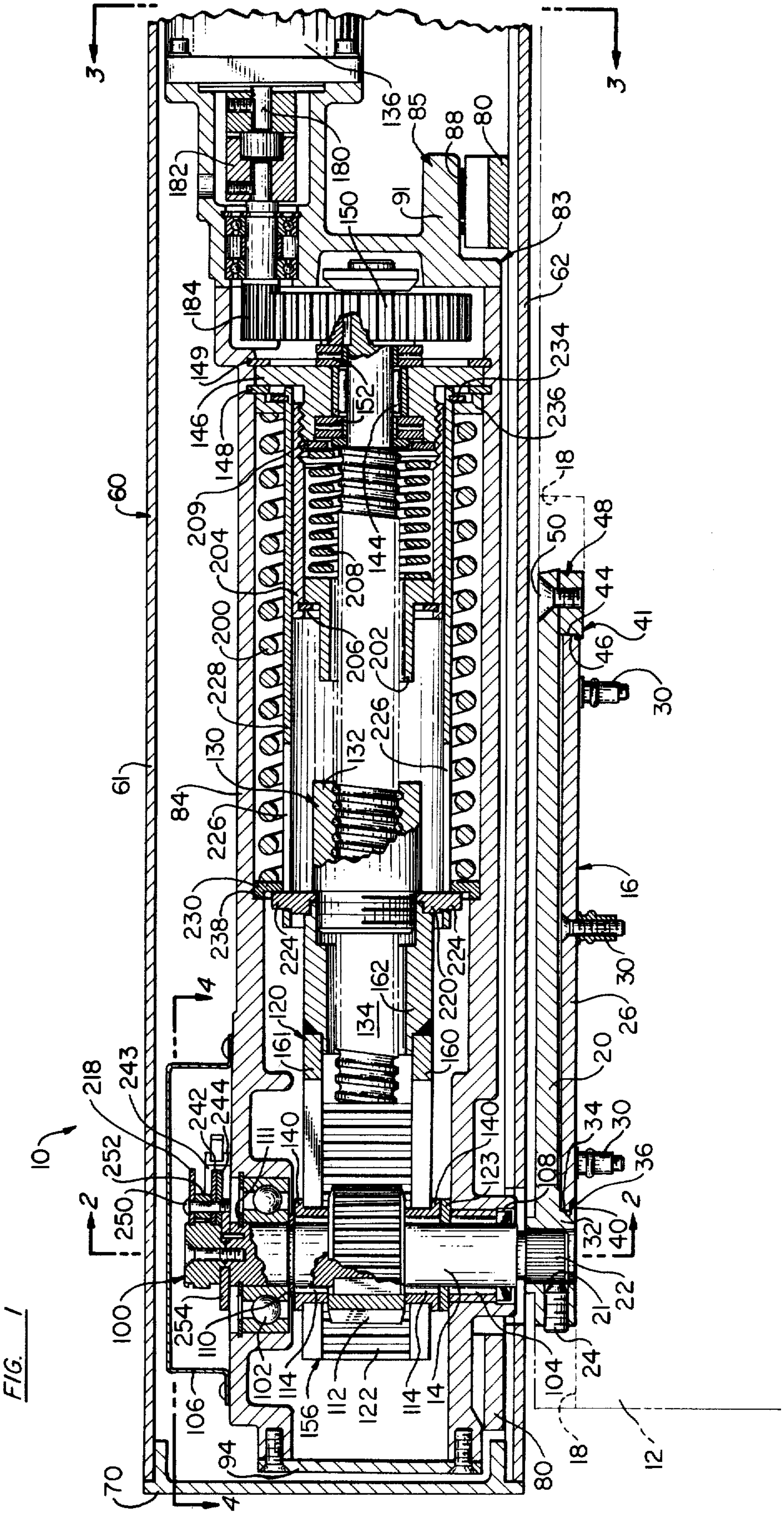
FIG. 1 is a partial side elevation section view, partly broken away and partly in section, of an embodiment of a door operator of the present invention, showing the door operator installed for operating a swinging door partly shown in outline in broken lines.

Referring now to the drawings in detail wherein like numerals designate like parts, and referring in particular to FIGS. 1-5 and 8, a door operator 10 incorporating an embodiment of the present invention is shown employed as as in-header or internally mounted operator overhead a pivotal or swinging door 12. The door operator 10 is directly connected to the door 12 via a lever adjustment mechanism 16 mounted within a standard slot 18 (e.g., having $\frac{5}{8}$ inch depth) in the upper edge of the door 12 and connected to a vertical pivot or drive shaft 14 of the ldoor operator 10. The lever adjustment mechanism 16 comprises an upper or overlying lever 20 with a splined bore 21 receiving a lower depending splined end 22 of the drive shaft 14 and secured to the drive shaft 14 by a set screw 24. A lower or underlying plate or lever 26 of the lever adjustment mechanism 16 is mounted within the door slot 18 and secured directly to the upper edge of the door along the door centerline with suitable fasteners 30. An inner hub 32 of the upper lever 20 is formed with a cylindrical bearing section 34 coaxial with the shaft 14, and the inner end of the lower lever 26 has a conforming cylindrical bearing section 36 engaging the bearing section 34 for laterally retaining the inner end of the lower lever 26 on the hub 32 and yet permit limited pivotal adjustment (for example ±2° from a center position) of the lower lever 26 relative to the upper lever 20. The hub 32 is also formed with a lower coaxial flange section 40 for axially retaining the inner end of the lever 26 in underlying nested association with the overlying lever 20.

The two levers 20, 26 are secured together at their outer ends by an adjustable lock 41. For that purpose the underlying lever 26 has an outer coaxial tooth locking sector 44, and a locking element 48 mounted by a fastener 50 on the outer end of the overlying lever 20 has a conforming tooth locking sector 46 engageable with the tooth locking sector 44. The locking element 48 also has an inwardly projecting flange 54 underlying the tooth sector 44 for retaining the outer end of the underlying lever 26 in nested association with the overlying lever 20. The outer end of the flange 54 and a recessed shoulder 56 of the underlying lever 26 have conforming cylindrical sectors coaxial with the shaft 14 permitting angular adjustment of the lower lever 26 relative to the upper lever 20. Thus, after the lower lever 26 is affixed to the door with the fasteners 30 and the upper lever 20 is affixed to the drive shaft 14, the door 12 can be pivotally adjusted slightly to position the door at its desired closed position before securing the locking element 48 in place with the fastener 50.

In the door operator installation shown in FIGS. 1–5, the drive shaft 14 also serves as the upper pivot for the door 12. Alternatively, the door operator 10 can be externally or surface mounted on the doorway header for operating a swinging or pivotal door and with its drive shaft 14 laterally offset (for example, 5 inches or more) from the pivot axis of the door and connected to the door through a suitable linkage (not shown). A swinging door is typically pivoted approximately 90° from its closed to its fully open position and whereby in an in-header installation, the shaft 14 is rotated 90° for opening the door. However, in a surface mounted installation, because of the lateral offset of the axis of the drive shaft 14 from the door pivot axis, the door operator drive shaft 14 typically has to be rotated from 105° to 120° to open the door 90° on the same side of the doorway as the surface mounted door operator and from 60° to 75° to open the door on the opposite side of the doorway. As described further hereinafter, the door operator 10 of the present invention is adapted to be employed in either type of installation for opening the door in either direction.

Figure 3:
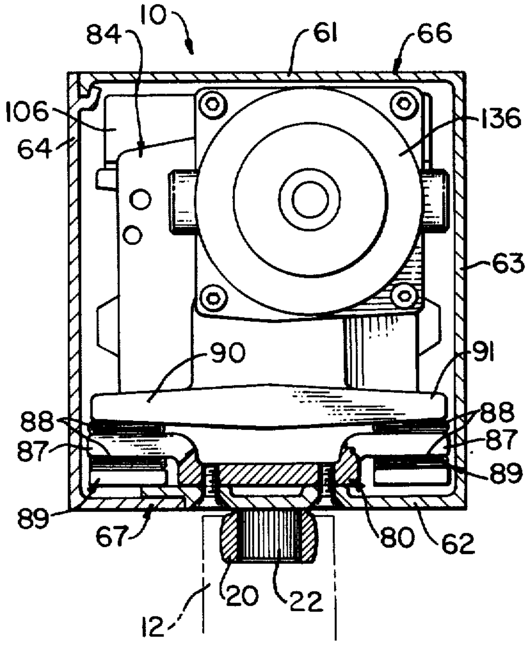
FIG. 3 is a transverse elevation section view, partly broken away and partly in section, taken substantially along line 3—3 of FIG. 1, also partly showing the outline of the swinging door in broken lines.

The door operator 10 comprises an elongated boxlike outer housing or enclosure 60 having a transverse rectangular cross section with parallel top and bottom walls 61, 62 and parallel sidewalls 63, 64 and formed by generally U-shaped and generally L-shaped aluminum extrusions 66, 67 respectively. A removable rectangular end cap 70 is provided at each end of the enclosure 60. The two extrusions 66, 67 are suitably fastened together so that the L-shaped extrusion 67 may be readily laterally removed to provide access to the internal door operator mechanism mounted on two longitudinally spaced yokes or supports 80 secured to the other extrusion 66 as seen in FIG. 3.

Figure 2:
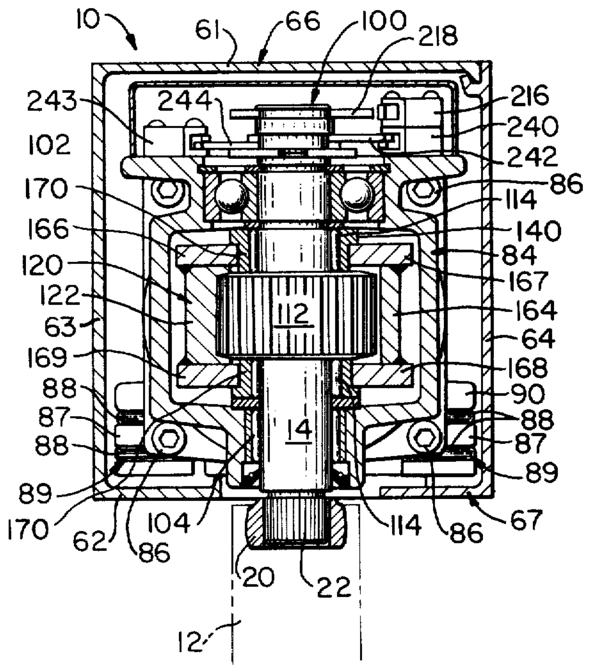
FIG. 2 is a transverse elevation section view, partly broken away and partly in section, of the door operator, taken substantially along line 2—2 of FIG. 1, also partly showing the outline of the swinging door in broken lines.

An elongated frame 83 comprising an elongated generally tubular, cast aluminum support 84 and a cast aluminum motor support 85 (secured to the right end of the tubular support 84 as seen in FIG. 1, by fasteners 86 shown in FIG. 2) provides the structural support for the moving parts of the door operator mechanism. The elongated frame 83 also comprises a heavy steel cap 94 mounted on the opposite end of the tubular support 84 from the motor support 85. The frame is mounted on laterally outwardly extending arms 87 of the two longitudinally spaced yokes 80 via resilient mounts 89 secured to integral flanges 90, 91 of the frame and having resilient bushings or cushions 88 on opposite sides of each arm 87.

A vertical spindle assembly 100 which comprises the vertical drive shaft 14 is rotatably mounted on the generally tubular support 84 (adjacent to but suitably spaced from the end cap 94 for a reason explained hereinafter) by an upper ball bearing 102 and a lower needle bearing 104. A sheet metal switch cover 106 encloses the upper end of the spindle 100, and a suitable seal 108 is provided at the lower end of the drive shaft 14 to seal the internal mechanism. Locating snap rings 110, 111 at the ends of the inner and outer races of the ball bearing 102 provide for axially locating the spindle 100 on the tubular support frame 84. A spindle drive gear 112 is keyed to the drive shaft 14 approximately midway between the spindle support bearings 102, 104, and a pair of needle bearings 114 of the spindle 100 are provided on the shaft 14 on opposite ends of the drive gear 112 for engagement by a reciprocable spindle operator 120 having a rack gear 122 in mesh with the spindle drive gear 112. Also, a plastic washer 123 of the spindle 100 is provided for axially locating the lower needle bearing 114.

A recirculating-ball, bidirectional drive mechanism 130 comprising a non-rotating, recirculating-ball, drive nut 132 and an elongated rotary drive screw 134 interconnects a rotary electric drive motor 136 with the reciprocable rack gear 122. The horizontal rotary drive screw 134 is mounted with its axis perpendicular to and intersecting the vertical axis of the rotary spindle 100 midway between the axial ends of the spindle drive gear 112, and the forward end of the drive screw 134 is supported and located via the reciprocable spindle operator 120, by the outer race end flanges 140 of the two spindle needle bearings 114. The rear end of the rotary drive screw 134 is rotatably supported by a needle bearing 144 in a hub 146 secured within the rear end of the main tubular support 84 by a pair of axially spaced snap-rings 148, 149. A drive gear 150 is keyed onto the rear end of the drive screw 134, and a pair of axial thrust needle bearings 152 are provided on opposite axial ends of the rear support hub 146 for transmitting screw thrust loading through the hub 146 to the tubular support 84.

The forward end of the spindle operator 120 has a generally U-shaped of bifurcated end 156 with a pair of longitudinally extending generally parallel legs on opposite sides of the spindle 100. The U-shaped end 156 is formed by a pair of parallel, upper and lower, forged U-shaped plates 160, 161 welded to a rear tubular support 162. The rack gear 122 is welded between the U-shaped plates 160, 161 on one side of the spindle 100 and a flat plate 164 is welded between the U-shaped plates 160, 161 on the opposite side of the spindle 100. Each U-shaped plate 160, 161 provides a pair of parallel guides or bearings 166, 167 and 168, 169 on opposite sides of the spindle 100 and engageable with an outer race 170 of the respective spindle needle bearing 114. The four guides or bearings 166–169 thereby provide for properly guiding the spindle operator 120 back and forth perpendicular to the spindle 100 with the rack gear 122 in proper mesh with the spindle drive gear 112, as the spindle 100 is rotated in opposite angular directions. Also, the outer race flanges 140 of the spindle needle bearings 114 engage the guide bearings 166–169 for correctly axially positioning the spindle operator 120 relative to the spindle drive gear 112.

The lateral separating force between the intermeshing rack gear 122 and the spindle drive gear 112 is transmitted diametrically of the rack gear 122 directly through the guide or thrust bearings 167, 168 on the opposite side of the spindle 100 from the rack gear 122. Thus, the lateral separating force between the rack gear 122 and spindle drive gear 112 is not transmitted directly or indirectly to the tubular support 84. Also, the opposed parallel bearings 166, 167 and 168, 169 are spaced to provide a slight clearance (e.g. 0.010 in.) and so that only the bearings 167, 168 frictionally engage the outer races 170 of the spindle needle bearings 114 during rotation of the spindle 100.

The rotary electric motor 136 is preferably a suitable small, high speed, DC motor with a permanent magnet field, and adapted to be electrically driven in either angular direction in accordance with the door operator installation. The motor drive shaft 180 is connected via a suitable resilient drive coupling 182 to a gear 184 in mesh with the gear 150 mounted on the drive screw 134. The drive ratio provided between the motor 136 and spindle 100 is established, for example so that the motor 136 rotates at the rate of one hundred fifty-two revolutions for each revolution of the spindle drive shaft 14.

Figure 7:
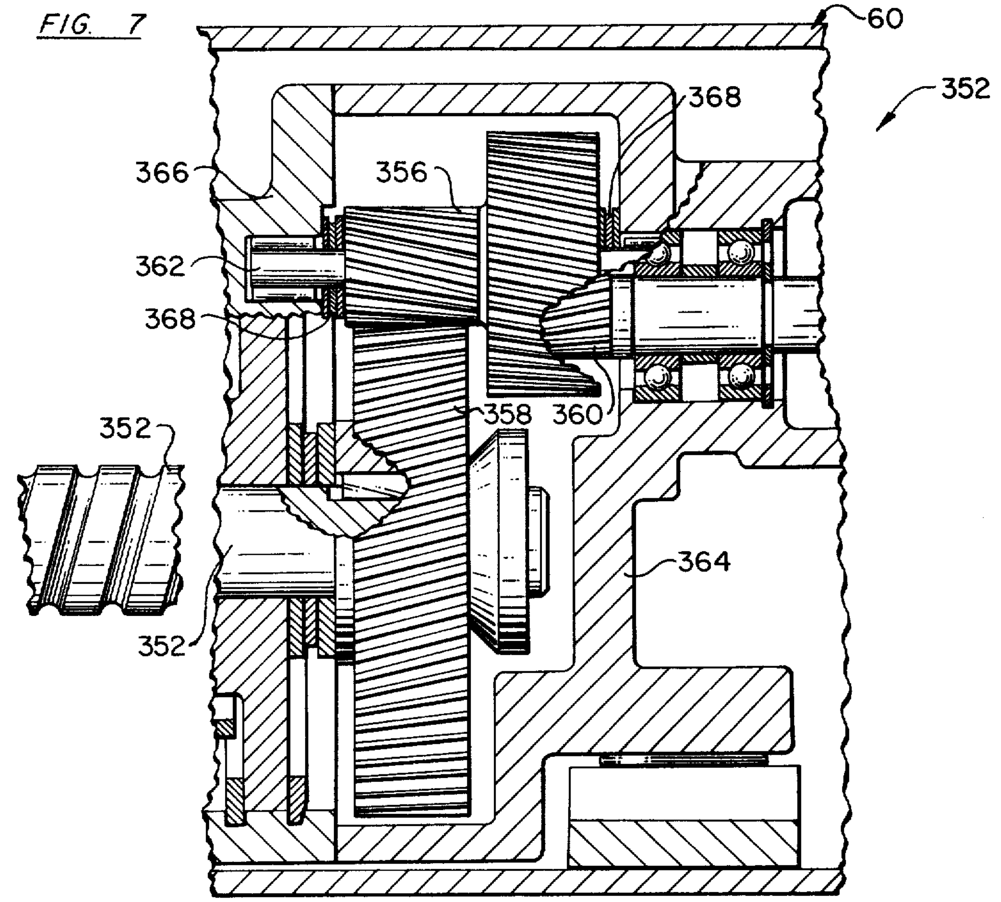
FIG. 7 is an enlarged partial side elevation section view, partly broken away and partly in section, of another modified door operartor.

In a slightly different door operator embodiment 352 shown in part in FIG. 7, the drive train is modified slightly to employ a modified ball drive screw 352 with a greater lead angle, providing for example a pitch of one-half inch. Because of the resulting lower drive ratio, the drive train is further modified to add a compound helical gear 356 between a helical gear 358 mounted on the drive screw 352 and a helical gear 360 mounted on the motor drive shaft. The intermediate compound gear 356 is mounted on a shaft 362 which extends between a modified motor support 364 and a modified tubular support 366 of the door operator frame, and suitable thrust bearings 368 for the intermediate compound gear 356 are provided at the ends of the shaft 362. Accordingly, with the provision of the intermediate compound gear 356, the drive ratio between the motor 136 and spindle 100 can be established as desired (for example, at a ratio of 158.8:1) to provide the desired bidirectional operation.

Figure 4:
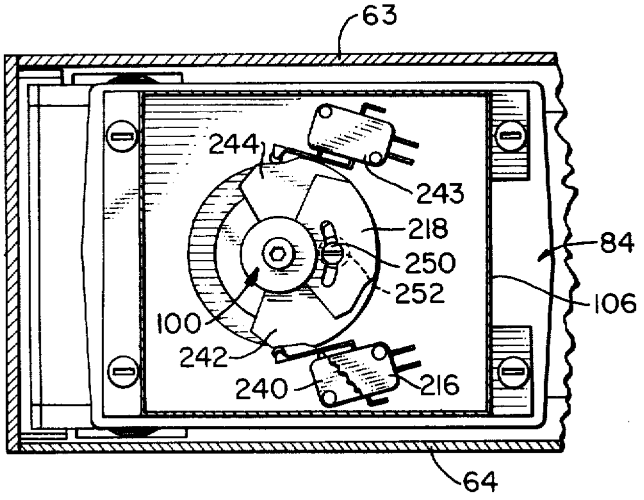
FIG. 4 is a partial top plan section view, partly broken away and partly in section, of the door operator, showing a control switch mechanism thereof.
Figure 5:
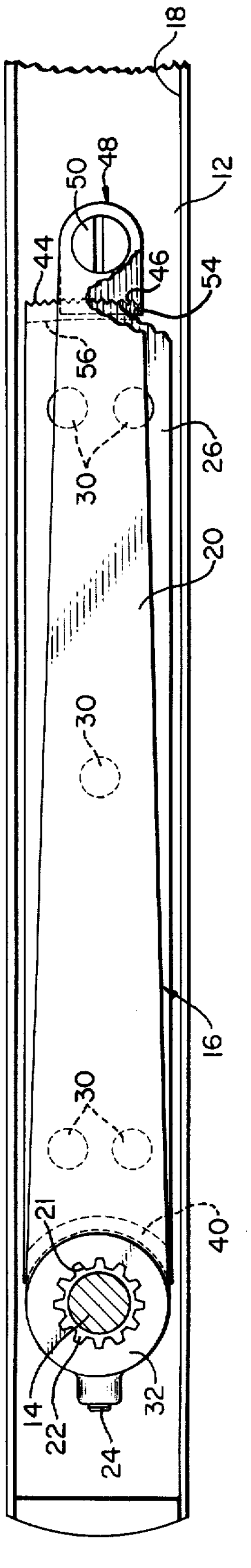
FIG. 5 is an enlarged top plan view, partly broken away and partly in section, showing a door adjustment mechanism of the door operator.

In the installation shown, the door operator 10 is employed for a right hand operating door (i.e., a door swinging clockwise in the opening direction as seen from above the door). For opening the door from its normal or closed position shown, the electric motor 136 is energized to pull or withdraw the rack gear 122, to the right as seen in FIG. 1, against the bias of the heavy return spring 200 having for example a preload of about 500 lbs. The spindle 100 is thereby rotated in the clockwise direction as seen in FIG. 4, until the non-rotating, traveling drive nut 132 engages a coaxial annular abutment collar 202 surrounding the screw 134. The abutment collar 202 is mounted within a coaxial support sleeve 204 (having a rear end threaded onto the fixed support hub 146) between a forward snap ring 206 and a coaxial helical compression spring 208 (preloaded for example to approximately 500 lbs.) mounted intermediate the abutment collar 202 and a washer 209 engaging the fixed support hub 146. Accordingly, the abutment collar 202 provides a cushioned stop for limiting the opening rotation of the swinging door 12, for example to 90°, pre-established by the axial setting of the adjustable support sleeve 204. Also, the abutment collar spring 208 permits overtravel of the door 12, for example due to inadvertent engagement of the open door by a person, cart, etc. without breaking or overstressing the mechanical drive train of the door operator.

For opening the door, the motor is suitable initially energized, for example, by a conventional doorway mat operating switch 322 ( shown in FIG. 8) to initially open the door at a relatively rapid rate. After the door has opened, for example approximately 75°, a slowdown control switch 216 (shown in FIGS. 4 and 8) is actuated by a cam 218 mounted on the spindle drive shaft 14. The slowdown control switch 216 is connected in a motor control circuit 219 (functionally shown in FIG. 8) to reduce the motor drive torque and thereby slow down the door as it approaches its fully open position. Accordingly, the non-rotating drive nut 132 engages the abutment collar 202 at a relatively low speed. Thereafter, the DC motor 136 is held stalled, at a relatively low motor torque sufficient to hold the door open with the drive nut 132 remaining in engagement with the abutment collar 202. The door 12 is held open by the stalled motor 136, for example until the usual doorway mat safety switch 326 (shown in FIG. 8) on the exit side of the doorway is released (after a pedestrian has passed through the doorway) or after a predetermined time interval of, for example one and one-half seconds after the mat operating switch is released, whichever is longer.

Accordingly, the slowdown control switch operating cam 218 is angularly positioned to slow down the door a sufficient angle before engagement with the abutment collar 202, and the abutment collar 202 is axially positioned via its threaded support sleeve 204 to establish the normal full open position of the door 12.

The non-rotatable drive nut 132 is threaded into a rear threaded bore of the tubular support 162, and a return spring abutment collar 220 is rigidly secured between the rear end of the tubular support 162 and the drive nut 132. The abutment collar 220 has four radially extending equiangularly spaced abutments 224 received within axially extending slots 226 of a coaxial spring actuating sleeve 228 for engagement with a forward thrust washer 230 of the coaxial return spring 200. A snap ring 234 is mounted on the rear end of the spring actuating sleeve 228 for engagement with a rear thrust washer 236 of the return spring 200. The two thrust washers 230, 236 are also engageable with a rearwardly facing annular shoulder 238 of the tubular support 84 and the forward locating snap ring 148 for the support hub 146.

With the door fully closed as shown, the abutment collar 220 engages the forward thrust washer 230 and also the sleeve 228 at the forward ends of the slots 226. Also, the two thrust washers 230, 236 engage their outer limit stops provided by the annular shoulder 238 of the tubular support 84 and the snap ring 148. Accordingly, with the door in its closed position, the preloaded return spring 200 is held compressed between the outer fixed pair of axially spaced abutments (provided by the shoulder 238 and the snap ring 148) and also between an inner pair of axially spaced abutments (provided by the snap ring 234 and the abutment collar 220). It is contemplated that suitable shims (not shown) may be employed in the spring abutment system to prevent play between the spring thrust washers 230, 236 and the tubular support 84 or between the spring thrust washers 230, 236 and the sleeve 228.

During right hand opening movement of the swinging door 12 as described, the return spring 200 is compressed rearwardly via the abutment collar 220 and forward thrust washer 230 as the spindle operator 120 is shifted to the right as viewed in FIG. 1. During such rearward compression of the spring 200, during which the spring can be compressed to a loading of up to 700 lbs., the abutment sleeve 228 remains substantially stationary as the four radial abutments 224 are free to shift axially rearwardly within the slots 226. When the motor 136 is de-energized, the loaded spring 200 provides for returning the door to its fully closed position by shifting the spindle operator 120 back to its initial or normal position shown in FIG. 1. As the door 12 is thereby swung to its closed position, the drive screw 134 is driven by the ball drive nut 132 to rotate the motor 136 in reverse. The resulting reverse relatively high speed rotation of the DC motor 136 provides for automatically controlling or braking the rate of closure of the door through the magnetic interaction of the permanent magnet field with the motor armature. Also, the motor armature is shunted, initially through a suitable external resistance 340 (FIG. 8), as the door 12 is closed by the return spring 200, to control the motor braking action. Also, a closure slowdown control switch 240 mounted under the opening slowdown control switch 216 is operated by a cam 242 for slowing down the motor 136, for example the last 10° to 25° before the door 12 reaches its fully closed position. For that purpose, the door closure slowdown is preferably provided by shunting the motor armature without additional external resistance.

The return spring 200 is encased between the tubular support 84 and the abutment sleeve 228 coaxial with the drive screw 134, and the abutment sleeve 228 is reciprocably mounted on the abutment collar support sleeve 204 so that the door 12 may be manually swung in the opposite direction from its fully closed position, in the ounterclockwise direction as viewed from above the door operator 10. During such reverse opening movement of the door 12, the reciprocable spindle operator 120 is shifted to the left as viewed in FIG. 1, and the end plate 94 provides a limit stop engageable by the forward end of the spindle operator 120 for limiting the reverse opening rotation of the door 12 to 90° for example. The door 12 can thereby be manually opened in the reverse direction by overcoming the bias of the return spring 200 and, although the return spring is preloaded for example to approximately 500 lbs., a substantial mechanical advantage of between 35–40 to 1 is available for manually opening the door 12. Also, a break-open switch 243 operated by a spindle cam 244 is provided for de-activating the motor 136 for manually opening the door in the reverse direction. Thus, as a valuable safety measure, the door 12 can be readily manually opened in the reverse direction (and also in the normal opening direction against the bias of the return spring 200) in a panic or other emergency situation or if the motor drive fails for any reason.

Since the forward end of the reciprocable spindle operator 120 is mounted to straddle the spindle 100 and is connected to a rotary screw 134 having a screw axis perpendicular to and intersecting the axis of the spindle 100 at the midpoint of the spindle drive gear 112, the spindle operator 120 is adapted to be selectively mounted with the rack gear 122 on either side of the spindle drive gear 112. Accordingly, the spindle operator 120 can be in-header mounted as shown for operating a right hand swinging door as described. Alternatively, the spindle operator 120 can be mounted with the rack gear 122 on the opposite side of the spindle to that shown in FIG. 1 for an in-header installation for operating a left hand swinging door (i.e., a door opening counterclockwise as seen from above the door). Also, the motor control switches 216, 240 and 243 are mounted in diametrically opposed relationship and so that for a left hand swinging door, the stack of two slowdown switches 216, 240 and the breakaway switch 243 are interchanged. Also, the two switch operating cams 242, 244 are properly angularly adjusted and the switch operating cam 218 is turned over for a left hand swinging door. For that purpose the three cams 218, 242, 244 are mounted for angular adjustment on and for removal from the spindle 100 with a single threaded fastener 250 extending through angular adjustment slots of the cams 218, 242, 244 and a spacer 252 and threaded into a base ring 254 secured to the spindle shaft 14.

The door operator is also adapted to be surface mounted with the spindle drive shaft 14 connected to a swinging door through a suitable linkage (not shown) in any conventional manner. In such a surface installation, where the door operator is operated to open the door on the opposite side of the doorway, the door operator is operated generally as described with respect to the installation of FIGS. 1–4. However, the abutment collar support sleeve 204 is axially preset and the slowdown switch operating cam 218 is angularly set for a lower required spindle operating angle of for example between 60° to 75° for opening the door 90°.

Figure 6:
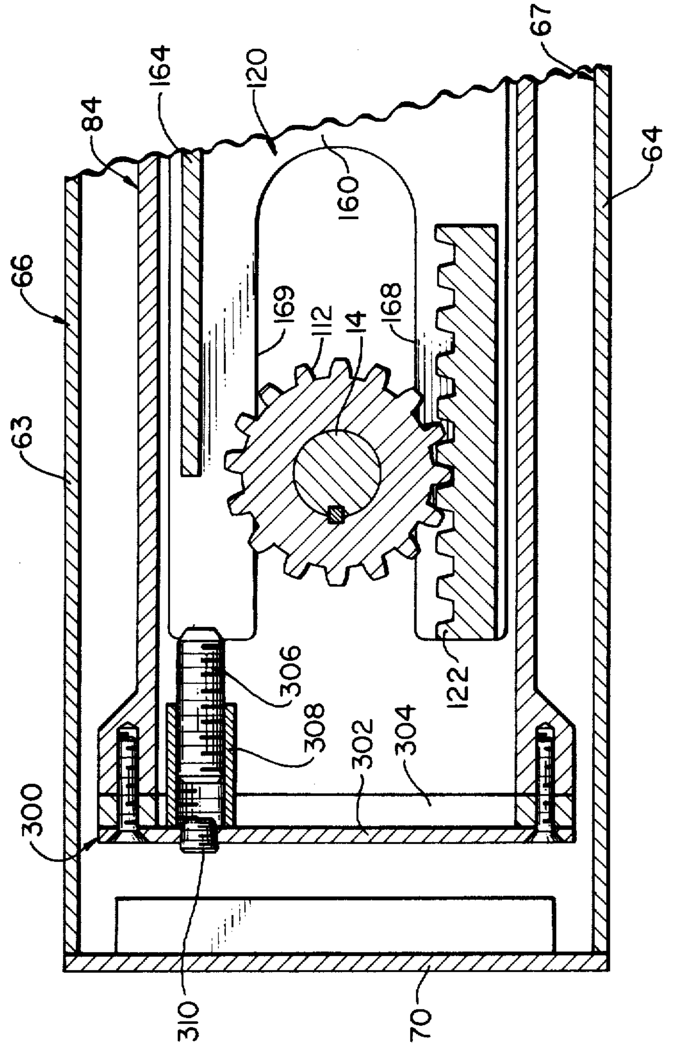
FIG. 6 is an enlarged partial top plan section view, partly broken away and partly in section, of a modified door operator.

The door operator described can be slightly modified as shown in FIG. 6 to lengthen and adjust the forward stroke of the reciprocable spindle operator 120. For that purpose, a modified cap assembly 300 having an end plate 302 and an annular spacer 304 are employed in place of the end cap 94 described with reference to the embodiment of FIG. 1. Also, an adjustable set screw stop 306 is provided for engagement with the forward end of the intermediate plate 164 of the spindle operator 120. The set screw stop 306 is mounted within a suitable internally threaded mounting sleeve 308 welded to the inner face of the end plate 302, and a threaded plug 310 is mounted on the end plate 302 for access for adjusting the set screw 306. The modified cap 300 is adapted to be mounted in either of two alternate positions on the forward end of the tubular support 84 in accordance with the two alternate positions of the reciprocable spindle operator 120. Also, the sidewall extrusions 66, 67 of the outer housing are made slightly longer to accommodate the extended length of the internal mechanism. The adjustable stop 306 thereby provides for adjusting the forward stroke of the spindle operator 120 for adjusting the concomitant rotation of the spindle 100, for example, within a range of 80° to 122°. And with the substantial range of stroke thereby provided, the door operator is adapted to be employed as a surface mounted door operator for opening a swinging door on the same side of the doorway as the door operator, by actuating the rack gear 122 forwardly to the left as seen in FIG. 6, with the motor 136. Also, the adjustable stop 306 is readily accessible at the door installation (by removing the enclosure end cap 70) for adjusting the opening swing of the door. In addition, in such a surface mounted door operator installation, the door can be manually opened in the reverse direction (as well as in the normal opening direction) to shift the drive nut 132 rearwardly toward the abutment collar 202. The motor control switches 216, 240, 243 would be positioned and the switch cams 218, 242, 244 would be positioned and angularly adjusted as appropriate for each type of installation.

Figure 8:
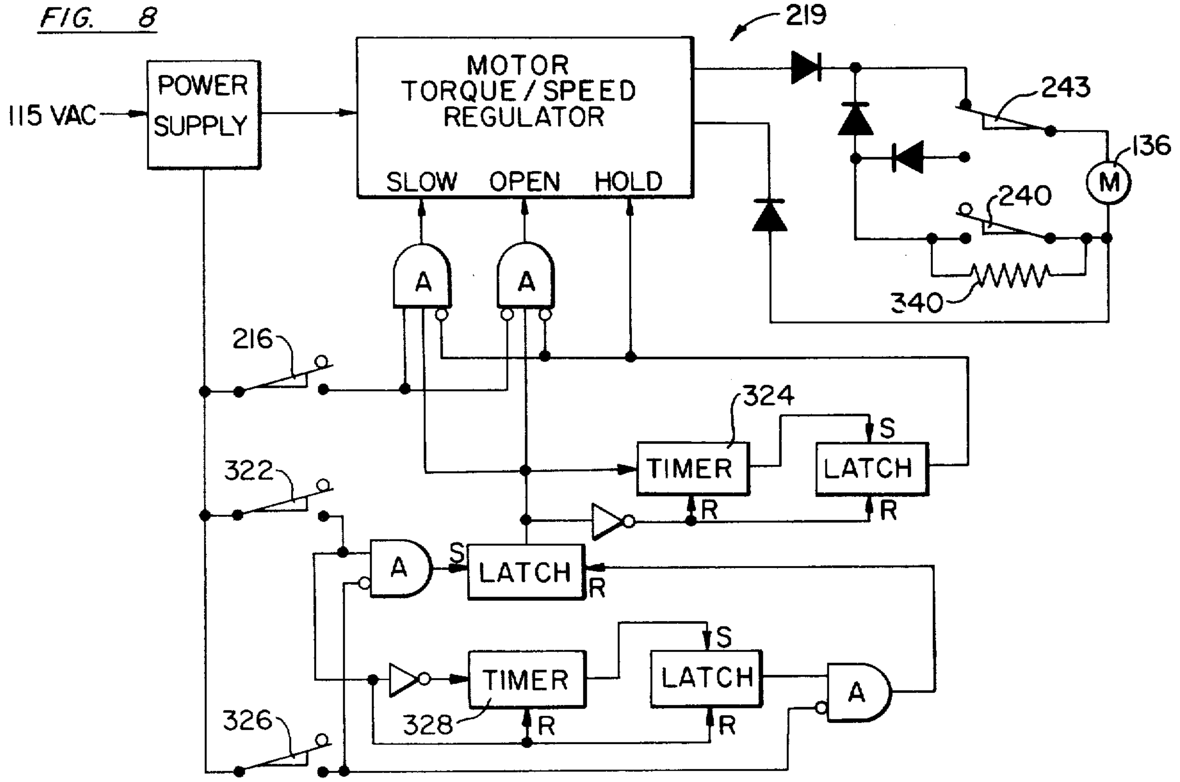
FIG. 8 is a functional schematic diagram of a motor control circuit of the door operator.

A functional schematic diagram of an exemplary motor control circuit 320 for the door operator is shown in FIG. 8 (with the switches shown in their normal or closed door positions). Briefly, the traffic responsive mat operating switch 322 is connected for energizing the motor 136 for opening the door. The door slowdown switch 216 is connected for reducing the motor torque to slow down the door before it reaches its fully open position. Also a timer 324 is shown employed for reducing the motor torque to a predetermined low level sufficient to hold the door open after a predetermined time interval of, for example, six seconds. Thus, for example, if after the door is locked at the end of business hours, a box or other weight is placed on the mat operating switch 322, the motor 136 will be held energized after the predetermined time interval of six seconds at a very low current level which would not overheat the motor 136.

When the mat safety switch 326 is released or after a predetermined time interval of, for example, one and one-half seconds (established by a suitable timer 328) after the mat operating switch 322 is released, the motor 136 is de-energized to permit the return spring 200 to close the door. The motor armature is shunted via the series connected resistor 340 to brake the motor 136 as it is driven in reverse by the spring 200. The closure slowdown switch 240 is operated 10° to 25° before the door reaches its fully closed position to increase the motor braking action by directly shunting the motor armature (and bypass the resistor 340).

The break-open switch 243 is connected to ensure that the motor 136 remains de-energized after the door has been manually opened, for example 3° to 6° in the reverse direction. However, the motor braking control circuit remains effective for braking the door as it is thereafter spring returned in the opposite direction and until the door reaches the 3° to 6° switch operating position.

Thus, it can be seen that the door operator of the present invention can be in-header or surface mounted, can be motor operated to open a swinging door in either direction and can be manually operated in the reverse direction in an emergency situation; and in all such applications the door operator provides for spring closure of the door smoothly to its normal or closed position.

As will be apparent to persons skilled in the art, various modifications, adaptations and variations of the foregoing specific disclosure can be made without departing from the teachings of the present invention.

I claim:

1. In a door operator having a rotary spindle with a coaxial spindle drive gear and operable in opposite angular directions thereof for opening and closing a swinging door, a reciprocable spindle operator with a rack gear in mesh with the spindle drive gear, mounted for linear movement perpendicular to the spindle axis in opposite linear directions corresponding to rotation of the spindle in opposite angular directions respectively, a rotary electric drive motor, and a drive mechanism interconnecting the rotary electric motor and reciprocable spindle operator having a ball drive screw with an axis parallel to the axis of reciprocable movement of the spindle operator and a recirculating ball, drive nut mounted on the drive screw for relative rotation for translating linear and rotary motion between the reciprocable spindle operator and rotary drive screw respectively, the improvement wherein the spindle drive gear is intermediate the axial ends of the rotary spindle, wherein the drive screw and drive nut have an axis perpendicular to and intersecting the drive gear axis, one of said drive screw and drive nut being fixed to the spindle operator, and the rotary electric motor being connected for rotating the other, and wherein the reciprocable spindle operator comprises a pair of lateral thrust bearings generally diametrically of the rack gear and on opposite axial ends of the spindle drive gear respectively, for transmitting lateral thrust between the rack gear and spindle during linear movement of the spindle operator.

2. A door operator according to claim 1 wherein the reciprocable spindle operator has a bifurcated end with a first elongated leg having said rack gear and a second elongated leg having said pair of lateral thrust bearings.

3. A door operator according to claim 1 wherein the reciprocable spindle operator comprises a pair of lateral guide bearings engageable with the spindle generally diametrically of the pair of lateral thrust bearings respectively.

4. A door operator according to claim 1 wherein the spindle comprises rolling bearings on opposite axial ends of the spindle drive gear engageable by the lateral thrust bearings respectively of the spindle operator.

5. A door operator according to claim 1 further comprising an elongated generally helical, preloaded compression spring generally coaxial with the drive screw, a first pair of fixed axially spaced compression spring limits at opposite axial ends of the compression spring, and a second pair of axially spaced compression spring limits at opposite axial ends of the compression spring for compressing the spring in opposite directions as the spindle operator moves in opposite directions from an intermediate position thereof for returning the spindle operator to its said intermediate position with the preloaded compression spring.

6. A door operator according to claim 1 further comprising an elongated generally tubular support frame having a longitudinally extending chamber therein, the rotary spindle being rotatably mounted on the support frame to extend axially transversely across the support frame chamber generally perpendicular to the longitudinal axis thereof, the reciprocable spindle operator being reciprocably mounted and the drive screw being mounted to extend longitudinally within the chamber, a preloaded generally helical compression spring mounted within the chamber generally coaxially with the drive screw and having at least one axial end thereof restrained by the tubular support and its other axial end engageable with the spindle operator to bias it in one linear direction to a predetermined linear position thereof.

7. In a door operator having a spindle with a rotary drive gear operable in opposite angular directions thereof for opening and closing a door, a reciprocable spindle operator with a rack gear in mesh with the drive gear, mounted for linear movement perpendicular to the drive gear axis in opposite linear directions corresponding to rotation of the drive gear in opposite angular directions respectively, and means for actuating the spindle operator in at least one direction thereof for opening a door, the improvement wherein the door operator comprises mounting means for mounting the spindle operator in either of two 180° angularly spaced positions thereof about an axis, parallel to the direction of linear reciprocable movement thereof, normal to and intersecting the drive gear axis and with the rack gear in mesh with the drive gear in diametrically opposed positions for rotating the spindle drive gear in opposite directions respectively relative to the direction of linear movement of the spindle operator.

8. A door operator according to claim 7 wherein the rotary drive gear is intermediate the axial ends of the spindle, and wherein the mounting means comprises lateral thrust bearing means on the spindle operator generally diametrically of the rack gear and on opposite axial ends of the drive gear respectively for transmitting lateral thrust between the rack gear and spindle during linear movement of the spindle operator.

9. A door operator according to claim 7 wherein the actuating means comprises bi-directional spring means for biasing the spindle operator in both linear directions thereof to an intermediate linear position for returning a swinging door in both angular directions to an intermediate closed angular position thereof.

10. In a door operator having a spindle with a rotary drive gear operable in opposite angular directions thereof for opening and closing a swinging door, a reciprocable spindle operator with a rack gear in mesh with the spindle drive gear, mounted for linear movement perpendicular to the spindle axis in opposite directions corresponding to rotation of the spindle in opposite angular directions respectively, and means for actuating the spindle operator in first and second opposite linear directions thereof for opening and closing a swinging door respectively, the improvement wherein the actuating means comprises a rotary drive screw having an axis perpendicular to and intersecting the drive gear axis and rotatable in opposite angular directions thereof for reciprocating the spindle operator in opposite linear directions thereof respectively, an elongated generally helical, preloaded compression spring generally coaxial with and encircling the drive screw for biasing the spindle operator in opposite linear directions to an intermediate linear position thereof for rotating the rotary drive gear in corresponding opposite angular directions to an intermediate angular position thereof corresponding to a closed position of a swinging door, a first pair of fixed axially spaced compression spring limits at opposite axial ends of the compression spring, and a second pair of axially spaced compression spring limits at opposite axial ends of the compression spring for compressing the spring in opposite directions as the spindle operator moves in opposite directions from said intermediate position thereof for returning the spindle operator to its said intermediate position with the preloaded compression spring.

11. A door operator according to claim 10 wherein the actuating means further comprises motor means connected for actuating the spindle operator in at least one linear direction from its said intermediate position for opening a swinging door in a corresponding direction, the motor means permitting manually actuating the spindle operator, via a swinging door and the rotary drive gear, in the opposite linear direction from its said intermediate position for manually opening a swinging door in the opposite direction.

12. In a door operator having a rotary spindle with a door pivot shaft for a swinging door, spindle drive means for rotating the spindle in opposite angular directions from and to a pre-established angular position thereof for opening and closing a swinging door respectively, and lever means mounted on the door pivot shaft for connecting the door pivot shaft to a swinging door for opening and closing the swinging door with the rotary spindle, the improvement wherein the lever means comprises upper overlying and lower underlying coaxial levers respectively, the overlying lever being mounted on the door pivot shaft for being rotated thereby and the lower underlying lever being adapted to be mounted on the upper edge of a swinging door to swing the door, the lower underlying lever being pivotally mounted at its inner end for pivotal adjustment of the lower lever relative to the upper lever about the axis of the door pivot shaft, the upper and lower levers having locking means at their outer end, for selectively locking the lower underlying lever to the upper lever in any adjusted pivotal position thereof within a limited range of pivotal adjustment of the lower lever relative to the upper lever.

13. A door operator according to claim 12 wherein one of the levers comprises a lever arm, a locking element, detachably mounted on the lever arm, having a first circumferential tooth sector coaxial with the door pivot shaft and wherein the other lever has a second tooth sector conforming to and engageable by the first tooth sector of the locking element for selectively locking the lower lever to the upper lever.

14. In a door operator having a rotary spindle with a coaxial drive gear and operable in opposite angular directions thereof for opening and closing a door, a reciprocable spindle operator with a rack gear in mesh with the spindle driver gear, mounted for linear movement perpendicular to the spindle axis in opposite linear directions corresponding to rotation of the spindle in opposite angular directions respectively, a rotary electric motor, a bi-directional drive mechanism interconnecting the rotary electric motor and reciprocable spindle operator having a ball drive screw with an axis parallel to the axis of linear movement of the spindle operator, and a recirculating ball, drive nut mounted on the drive screw for relative rotation for actuating the spindle operator in at least one linear direction thereof with the electric motor, and a preloaded, generally helical compression spring axially biasing the spindle operator in at least the opposite linear direction to a predetermined linear position thereof, the improvement wherein the drive screw and drive nut have an axis perpendicular to and intersecting the drive gear axis, one of said drive screw and drive nut being fixed to the spindle operator, and the rotary electric motor being connected for rotating the other, wherein the generally helical compression spring is coaxial with and encircles the drive screw, wherein the door operator comprises a first pair of fixed axially spaced compression spring limits at opposite axial ends of the compression spring, and a second pair of axially spaced compression spring limits at opposite ends of the compression spring mounted for compressing the spring in opposite directions upon linear movement of the spindle operator in opposite linear directions from its said predetermined linear position.

15. In a door operator having a rotary spindle with a rotary drive gear operable in opposite angular directions thereof for opening and closing a swinging door, a reciprocable spindle operator with a rack gear in mesh with the spindle drive gear, mounted for linear movement perpendicular to the spindle axis in opposite linear directions corresponding to rotation of the spindle in opposite angular directions respectively, and means for actuating the spindle operator in first and second opposite linear directions thereof for opening and closing a swinging door respectively, the improvement wherein the actuating means comprises bi-directional spring means for biasing the spindle operator in opposite linear directions to an intermediate linear position thereof for rotating the rotary drive gear in corresponding opposite angular directions to an intermediate angular position thereof corresponding to a closed position of a swinging door and drive means including a rotary electric drive motor, connected for actuating the spindle operator with the electric drive motor by rotation of the motor in one angular direction, in one linear direction from its said intermediate position for opening a swinging door in a corresponding direction, and connected for rotating the electric motor in said one angular direction by actuation of the spindle operator in its said one linear direction, the drive means permitting manually actuating the spindle operator, via a swinging door and the rotary drive gear, in the opposite linear direction from its said intermediate position for manually opening a swinging door in the opposite direction, and motor circuit means including first switch means for energizing the electric drive motor for rotation in said one angular direction for actuating the spindle operator in said one linear direction for opening a swinging door in a corresponding direction, second switch means, automatically operated when the spindle operator is manually actuated in the opposite linear direction from its said intermediate position, for preventing said energization of the electric drive motor in said one angular direction for actuating the spindle operator in said one linear direction, and motor shunting means operatively connected to the motor by the second switch means to shunt the motor and thereby dampen the door return to its closed position when manually released to permit the bi-directional spring means to actuate the spindle operator in its said one linear direction to its intermediate position.

16. In a door operator having a rotary spindle with a coaxial spindle drive gear and operable in opposite angular diiections thereof for opening and closing a swinging door, a reciprocable spindle operator with a rack gear in mesh with the spindle drive gear, mounted for linear movement perpendicular to the spindle axis in opposite linear directions corresponding to rotation of the spindle in opposite angular directions respectively, a rotary electric drive motor, and a drive mechanism interconnecting the rotary electric motor and reciprocable spindle operator having a ball drive screw with an axis parallel to the axis of reciprocable movement of the spindle operator and a recirculating ball, drive nut mounted on the drive screw for relative rotation for translating linear and rotary motion between the reciprocable spindle operator and rotary drive screw respectively, the improvement wherein the spindle drive gear is intermediate the axial ends of the rotary spindle, wherein the reciprocable spindle operator comprises a pair of lateral thrust bearings generally diametrically of the rack gear and on opposite axial ends of the spindle drive gear respectively, for transmitting lateral thrust between the rack gear and spindle during linear movement of the spindle operator, wherein the drive screw has an axis intersecting the spindle axis, and wherein the reciprocable spindle operator is adapted to be mounted in either of two 180° angularly spaced positions thereof about the axis of the rotary drive screw with the rack gear in engagement with the spindle drive gear in diametrically opposed positions of the rack gear for rotating the spindle in opposite directions relative to the direction of linear movement of the reciprocable spindle operator.

17. In a door operator having a rotary spindle with a coaxial spindle drive gear and operable in opposite angular directions therof for opening and closing a swinging door, a reciprocable spindle operator with a rack gear in mesh with the spindle driver gear, mounted for linear movement perpendicular to the spindle axis in opposite linear directions corresponding to rotation of the spindle in opposite angular directions respectively, a rotary electric drive motor, and a drive mechanism interconnecting the rotary electric motor and reciprocable spindle operator having a ball drive screw with an axis parallel to the axis of reciprocable movement of the spindle operator, a recirculating ball, drive nut mounted on the drive screw for relative rotation for translating linear and rotary motion between the reciprocable spindle operator and rotary drive screw respectively, and bi-directional spring means for biasing the spindle operator in both reciprocable directions to an intermediate linear position thereof for returning the rotary spindle to a corresponding intermediate angular position thereof, the rotary electric motor being adapted to be energized in one angular direction for shifting the spindle operator in one linear direction from said intermediate position thereof for opening a swinging door in one direction from a closed position thereof corresponding to said intermediate angular position of the rotary spindle, the rotary electric motor being rotatable via the rotary spindle, reciprocable spindle operator and drive screw, in the opposite angular direction for manually opening a swinging door in the opposite direction from its closed position, the improvement wherein the spindle drive gear is intermediate the axial ends of the rotary spindle, wherein the reciprocable spindle operator comprises a pair of lateral thrust bearings generally diametrically of the rack gear and on opposite axial ends of the spindle drive gear respectively, for transmitting lateral thrust between the rack gear and spindle during linear movement of the spindle operator, and wherein the door operator further comprises motor circuit means including first switch means for energizing the electric drive motor for actuating the spindle operator in said one linear direction for opening a swinging door in a corresponding direction and second switch means, automatically operated when the spindle operator is manually actuated in the opposite linear direction from its said intermediate position, for preventing said energization of the electric drive motor for actuating the spindle opertor in said one linear direction.

18. In a door operator having a spindle with a coaxial rotary drive gear operable in opposite angular directions thereof for opening and closing a swinging door, a reciprocable spindle operator with a rack gear in mesh with the drive gear, mounted for linear movement perpendicular to the drive gear axis in opposite linear directions corresponding to rotation of the drive gear in opposite angular directions respectively, and means for actuating the spindle operator in at least one linear direction thereof for opening a swinging door, the improvement wherein the drive gear is intermediate the axial ends of the spindle, wherein the spindle operator comprises lateral thrust bearing means generally diametrically of the rack gear and on opposite axial ends of the drive gear for transmitting lateral thrust between the rack gear and spindle during linear movement of the spindle operator, and wherein the actuating means comprises a drive screw member and a drive nut member mounted on the drive screw for relative rotation, the drive screw and drive nut members having an axis perpendicular to and intersecting the drive gear axis, one of said drive members being fixed to the spindle operator, and a rotary electric drive motor connected for rotating the other drive member for shifting the spindle operator in at least said one linear direction thereof.

19. A door operator according to claim 18 wherein the actuating means comprises bi-directional spring means for biasing the spindle operator in both reciprocable directions to an intermediate linear position thereof for returning a swinging door in both angular directions to an intermediate angular position thereof.

20. A door operator according to claim 19 wherein the actuating means further comprises motor means for shifting the spindle operator from its said intermediate position in at least said one linear direction thereof for opening a swinging door in a corresponding direction, the motor means permitting manually shifting the spindle operator, via the rotary drive gear, in the opposite linear direction from its said intermediate position, for manually opening a door in a corresponding opposite direction.

21. A door operator according to claim 19 wherein the bi-directional spring means comprises a preloaded generally helical compression spring coaxial with the reciprocable spindle operator, wherein the door operator comprises a first pair of fixed axially spaced compression spring limits at opposite axial ends of the compression spring, and a second pair of axially spaced compression spring limits at opposite ends of the compression spring operable for compressing the spring in opposite directions upon linear movment of the spindle operator in opposite linear directions from its said intermediate position.

22. In a door operator having a spindle with a coaxial rotary drive gear operable in opposite angular directions thereof for opening and closing a swinging door, a reciprocable spindle operator with a rack gear in mesh with the drive gear, mounted for linear movement perpendicular to the drive gear axis in opposite linear directions corresponding to rotation of the drive gear in opposite angular directions respectively, and means for actuating the spindle operator in at least one linear direction thereof for opening a swinging door, the improvement wherein the drive gear is intermediate the axial ends of the spindle, wherein the spindle operator comprises lateral thrust bearing means generally diametrically of the rack gear and on opposite axial ends of the drive gear for transmitting lateral thrust between the rack gear and spindle during linear movement of the spindle operator, and wherein the spindle operator is adapted to be mounted in either of two 180° angularly spaced positions thereof about an axis of linear reciprocable movement thereof extending normal to and intersecting the drive gear axis and with the rack gear in mesh with the drive gear in diametrically opposed positions for rotating the drive gear in opposite directions respectively relative to the direction of linear movement of the spindle operator.

23. In a door operator having a spindle with a rotary drive gear operable in opposite angular directions thereof for opening and closing a swinging door, a reciprocable spindle operator with a rack gear in mesh with the spindle drive gear, mounted for linear movement perpendicular to the spindle axis in opposite directions corresponding to rotation of the spindle in opposite angular directions respectively, and means for actuating the spindle operator in first and second opposite linear directions thereof for opening and closing a swinging door respectively, the improvement wherein the actuating means comprises bi-directional spring means for biasing the spindle operator in opposite linear directions to an intermediate linear position thereof for rotating the rotary drive gear in corresponding opposite angular directions to an intermediate angular position thereof corresponding to a closed position of a swinging door, and further comprising mounting means for mounting the spindle operator in either of two 180° angularly spaced positions thereof about an axis, parallel to the direction of linear reciprocable movement thereof, normal to and intersecting the drive gear axis and with the rack gear in mesh with the drive gear in diametrically opposed positions for rotating the drive gear in opposite directions respectively relative to the direction of linear movement of the spindle operator.

24. In a door operator having a rotary spindle with a coaxial spindle drive gear and operable in opposite angular directions thereof for opening and closing a swinging door, a reciprocable spindle operator with a rack gear in mesh with the spindle drive gear, mounted for linear movement perpendicular to the spindle axis in opposite linear directions corresponding to rotation of the spindle in opposite angular directions respectively, a rotary electric drive motor, and a drive mechanism interconnecting the rotary electric motor and reciprocable spindle operator having a ball drive screw with an axis parallel to the axis of reciprocable movement of the spindle operator and a recirculating ball, drive nut mounted on the drive screw for relative rotation for translating linear and rotary motion between the reciprocable spindle operator and rotary drive screw respectively, the improvement wherein the spindle drive gear is intermediate the axial ends of the rotary spindle, wherein the reciprocable spindle operator comprises a pair of lateral thrust bearings generally diametrically of the rack gear and on opposite axial ends of the spindle drive gear respectively, for transmitting lateral thrust between the rack gear and spindle during linear movement of the spindle operator, further comprising an elongated generally helical, preloaded compression spring generally coaxial with the drive screw, a first pair of fixed axially spaced compression spring limits at opposite axial ends of the compression spring, and a second pair of axially spaced compression spring limits at opposite axial ends of the compression spring for compressing the spring in opposite directions as the spindle operator moves in opposite directions from an intermediate position thereof for returning the spindle operator to its said intermediate position with the preloaded compression spring, and wherein the reciprocable spindle operator comprises an elongated cylindrical slide mounted coaxially between the helical compression spring and drive screw, one of said second pair of spring limits being mounted on the slide for compressing the spring in one direction upon movement of the spindle operator in said one direction from its said intermediate position, the slide being mounted to permit the rack gear to move relative to the slide in the opposite direction, the other of said second pair of spring limits being shiftable with the rack gear for compressing the spring in the opposite direction upon movement of the spindle operator in said opposite direction from its said intermediate position.

25. In a door operator having a rotary spindle with a coaxial spindle drive gear and operable in opposite angular directions thereof for opening and closing a swinging door, a reciprocable spindle operator with a rack gear in mesh with the spindle drive gear, mounted for linear movement perpendicular to the spindle axis in opposite linear directions corresponding to rotation of the spindle in opposite angular directions respectively, a rotary electric drive motor, and a drive mechanism interconnecting the rotary electric motor and reciprocable spindle operator having a ball drive screw with an axis parallel to the axis of reciprocable movement of the spindle operator and a recirculating ball, drive nut mounted on the drive screw for relative rotation for translating linear and rotary motion between the reciprocable spindle operator and rotary drive screw respectively , the improvement wherein the spindle drive gear is intermediate the axial ends of the rotary spindle, wherein the reciprocable spindle operator comprises a pair of lateral thrust bearings generally diametrically of the rack gear and on opposite axial ends of the spindle drive gear respectively, for transmitting lateral thrust between the rack gear and spindle during linear movement of the spindle operator, wherein the rotary spindle has a door pivot shaft for a swinging door and wherein the door operator further comprises lever means mounted on the door pivot shaft for connecting the door pivot shaft to a swinging door for opening and closing the swinging door with the rotary spindle, the lever means comprising upper overlying and lower underlying coaxial levers respectively, the overlying lever being mounted on the door pivot shaft for being rotated thereby and the lower underlying lever being adapted to be mounted on the upper edge of a swinging door to swing the door, the lower underlying lever having means mounting the lower lever at its inner end for pivotal adjustment of the lower lever relative to the upper lever about the axis of the door pivot shaft, the upper and lower levers having locking means at their outer end, for selectively locking the lower underlying lever to the upper lever in any adjusted pivotal position thereof within a limited range of pivotal adjustment of the lower lever relative to the upper lever.

* * * * *